United States Patent Office 3,425,397
Patented Feb. 4, 1969

3,425,397
ANIMAL LITTER PREPARATION
Benjamin M. Schulein, St. Louis, and Benjamin M. Schulein, Jr., St. Louis County, Mo., assignors to Neumond, Inc., St. Louis, Mo., a corporation of Missouri
No Drawing. Filed Jan. 13, 1967, Ser. No. 608,966
U.S. Cl. 119—1                    1 Claim
Int. Cl. A01k 67/00

ABSTRACT OF THE DISCLOSURE

A preparation for animal litters for absorbing, and neutralizing the odors of, animal waste matter comprising a chlorophyll-containing agent and an absorptive agent intermixed in dry, granule form.

Background of the invention

Heretofore many efforts have been made to develop an effective litter for animals, especially household pets, but such have not been successful for various reasons. One defiiciency of certain litters has been composing same of excessively light-weight material so that the discrete components thereof tend to adhere to the animal, as on the paws or the fur, for ultimate dropping off as the animal moves about the surrounding area with resultant untidiness. Another principal drawback has been the total absence from such litters of an agent for neutralizing or eliminating odors. Furthermore, most prior preparations have been, however, primarily constituted solely of various clays so that the same have been relatively heavy and thus not conducive to economic and facile handling as well as shipping. By the present invention these critical inadequacies have been overcome by the unique incorporation in a litter of both matter-absorbing materials and odor neutralizing agents.

Summary of the invention

It is an object of the present invention to provide a preparation for animal litters which embodies constituents adapted for absorbing animal excretory matter and for neutralizing odors, thereby rendering the litter useful in living areas.

It is another object of the present invention to provide a litter of the type stated which may be most economically manufactured, having a marked simplicity of dry, granule-type components which may be intermixed without utilization of costly machinery and equipment.

It is another object of the present invention to provide a litter of the type stated which is of exceedingly light-weight material so that the same may be handled and shipped in a facile manner, but yet which will not tend to adhere to an animal and cause unsightly tracking; which comprises a multiplicity of discrete dry components for providing a substantial effective surface area for high absorption characteristics; which is most reliable in usage; and which may be discarded after extended usage in a convenient fashion.

Description of the invention

In essence, this invention resides in the provision of a preparation comprising a chlorophyll-containing agent, such as alfalfa and like plants, and a lightweight, highly absorptive material, such as vermiculite and perlite, which components, when intermixed in a dry state, and in particle form, provide a markedly efficient and effective animal litter.

In order to prepare a litter in accordance with the present invention, there may be provided an absorbent consisting of expanded vermiculite, such as No. 2 Industrial Grade, and being of a size within the approximate range of 4 to 20 mesh so as to present a substantial surface area. Vermiculite is a well known article of commerce, being a micaceous mineral and being better known as hydrated magnesium-aluminum-iron silicate. When heated, vermiculite expands so that each granule thereof has a large number of internal, more or less parallel surfaces comprising a very large total area; said surfaces having an affinity for moisture, gases, and the like. Thus, vermiculite has a markedly high porosity, a low density, and high void volume to surface area. The said mineral is also insoluble in water, relatively chemically inert, and of exceeding lightweight.

Provided for mixture with the vermiculite is alfalfa, being preferably in pelletized form in accordance with well known practice; it being recognized that alfalfa has a relatively high chlorophyll content. Thus, the chlorophyll, which is the active ingredient of the alfalfa for the purposes of this invention, is in natural state. The vermiculite being in particle form and the pelletized alfalfa fall within the approximate range of 4 to 20 mesh and are subjected to suitable mixing equipment for intermixture. The ratio by weight of the vermiculite is approximately 20 percent, while that of the alfalfa pellets is 80 percent, while on a volume basis, the said ingredients are about equal. As so constituted, the mixture is of relatively lightweight so that a quantity of about 5½ quarts of the present litter, weighing about three pounds, is actually equal in volume to 8½ pounds of the conventional clay litter. Thus, the present litter may be easily handled and shipped most economically. The litter as so formed may, in usage, be deposited in a suitable receptacle for animal usage, such as litter boxes and the like. Upon animal elimination, the chlorophyll in the alfalfa will be activated by the moisture in the excretory matter for effectively neutralizing any odors. The vermiculite with its high absorptive capacity will absorb discharged matter so as to maintain the litter in substantially acceptably clean state for usage over a relatively extensive period of time without replacement. Although vermiculite is quite light in weight, the intermixture of the same with alfalfa will cause a desired weighting so that the vermiculite will be inhibited from adhering to the animal, such as its paws or the fur, for carriage to points beyond the litter with resultant tracking and untidiness. In view of its composition and physical characteristics, the litter of the present invention may be readily discarded, as by flushing down a drain, so that the replacement procedure may be easily effected with minimum effort.

Although the litter herein described may be useful with all types of domestic pets, the same has been found to be especially effective for cats. Apparently, the odor-neutralizing and absorptive properties of the litter constituents have a heightened activity when subjected to cat usage.

Although alfalfa is the chlorophyll agent of choice in view of the high content thereof, as well as of certain economies in production, the same may be replaced in the litter by other agents having naturally occuring chlorophyll, without diminution of the effectiveness of the litter; such other agents being algae, broome grass and timothy grass, among others. These alternative sources of chlorophyll may be prepared in the same way, as in pelletized form, and within the aforesaid mesh range. Furthermore, if desired, the vermiculite may be effectively replaced by perlite, a glassy rock containing silica, aluminum oxide, water and smaller amounts of soda, pot ash, and lime. This mineral also has the capacity of expanding under heat to form a light, fluffy matter, presenting substantial surface area for high absorptive use. The aforesaid alternative agents may be mixed in the same manner and the same proportions as the alfalfa and vermiculite above described.

It should be understood that changes in the methods, compositions, percentages and combinations set forth may be made without departing from the nature and principle of our invention.

Having thus described our invention, what we claim and desire to obtain by Letters Patent is:

1. An animal litter comprising a chlorophyll-containing agent from the class consisting of alfalfa, algae, broome grass and timothy grass, and a lightweight absorptive agent from the class consisting of vermiculite and perlite, said chlorophyll agent constituting approximately 80 percent by weight of the litter and said lightweight absorptive agent constituting approximately 20 percent by weight of the litter, said chlorophyll-containing agent and said lightweight absorptive agent being intermixed in dry particle state, the lightweight absorptive agent being in expanded granule form, and with the particles of said litter being within the mesh range of approximately 4 to 20.

References Cited

UNITED STATES PATENTS

| | | | |
|---|---|---|---|
| 2,179,591 | 11/1939 | Godchaux | 119—1 |
| 2,424,330 | 7/1947 | Robertson | 119—1 X |
| 2,708,418 | 5/1955 | Sugarman et al. | 119—1 |
| 2,848,976 | 8/1958 | Combs | 119—1 |
| 3,029,783 | 4/1962 | Sawyer et al. | 119—1 |
| 3,059,615 | 10/1962 | Kuceski et al. | 119—1 |
| 3,256,857 | 6/1966 | Karras | 119—1 |
| 3,286,691 | 11/1966 | McFadden | 119—1 |

FOREIGN PATENTS 878,423  9/1961  Great Britain.

ALDRICH F. MEDBERY, *Primary Examiner.*